(12) United States Patent
Zhou et al.

(10) Patent No.: US 11,884,867 B2
(45) Date of Patent: Jan. 30, 2024

(54) POLYMERIZABLE SURFACTANTS HAVING WATER WHITENING RESISTANCE AND METHODS FOR USE

(71) Applicant: RHODIA OPERATIONS, Lyons (FR)

(72) Inventors: Lichang Zhou, Lawrenceville, NJ (US); Adnan Siddiqui, Tenafly, NJ (US); Dongcheel Lee, Bucheon-Si (KR); Derek Pakenham, Hamilton, NJ (US); Eugene J. Anderson, Marlton, NJ (US); Shailesh Majmudar, Stamford, CT (US); Eunyong Kim, Siheung (KR); Homayoun Jamasbi, Lansdale, PA (US); An Tran, Newtown, PA (US); Peng Zhang, Singapore (SG)

(73) Assignee: RHODIA OPERATIONS, Lyons (FR)

(*) Notice: Subject to any disclaimer, the term of this patent is extended or adjusted under 35 U.S.C. 154(b) by 0 days.

(21) Appl. No.: 17/606,867

(22) PCT Filed: May 1, 2020

(86) PCT No.: PCT/US2020/030997
§ 371 (c)(1),
(2) Date: Oct. 27, 2021

(87) PCT Pub. No.: WO2020/227083
PCT Pub. Date: Nov. 12, 2020

(65) Prior Publication Data
US 2022/0235272 A1    Jul. 28, 2022

Related U.S. Application Data

(60) Provisional application No. 62/842,806, filed on May 3, 2019.

(51) Int. Cl.
| | |
|---|---|
| *C09K 23/02* | (2022.01) |
| *C09D 7/65* | (2018.01) |
| *C09D 7/45* | (2018.01) |
| *C09J 7/38* | (2018.01) |
| *C08G 65/26* | (2006.01) |
| *C09D 5/02* | (2006.01) |
| *C09D 133/04* | (2006.01) |
| *C09J 11/08* | (2006.01) |

(52) U.S. Cl.
CPC .......... *C09K 23/02* (2022.01); *C08G 65/2636* (2013.01); *C09D 5/022* (2013.01); *C09D 7/45* (2018.01); *C09D 7/65* (2018.01); *C09D 133/04* (2013.01); *C09J 7/38* (2018.01); *C09J 11/08* (2013.01); *C09J 2301/302* (2020.08); *C09J 2301/408* (2020.08); *C09J 2301/414* (2020.08); *C09J 2471/00* (2013.01)

(58) Field of Classification Search
CPC ........ C09K 23/02; C08G 65/2636; C09J 7/38; C09J 11/08; C09J 2301/302; C09J 2301/408; C09J 2301/414; C09J 2471/00; C09D 5/022; C09D 7/45; C09D 133/04; C09D 7/65
USPC ....................................................... 524/501
See application file for complete search history.

(56) References Cited

U.S. PATENT DOCUMENTS

| | | | |
|---|---|---|---|
| 4,814,514 A * | 3/1989 | Yokota | C08F 2/26 568/675 |
| 6,841,655 B1 | 1/2005 | Gota et al. | |
| 2006/0241229 A1* | 10/2006 | Yoshimura | D06M 15/263 524/416 |
| 2010/0016493 A1* | 1/2010 | Ternorutsky | C09J 133/08 524/460 |
| 2013/0047892 A1* | 2/2013 | Palmer, Jr. | C07C 43/23 106/447 |
| 2015/0038654 A1 | 2/2015 | Ogasawara et al. | |

FOREIGN PATENT DOCUMENTS

| | | |
|---|---|---|
| CN | 102417566 A | 4/2012 |
| DE | 102013209023 A1 | 11/2014 |
| EP | 1369434 A1 | 12/2003 |
| JP | 2004256776 A * | 9/2004 |
| WO | 2004029171 A1 | 4/2004 |
| WO | 2006060612 A2 | 6/2006 |
| WO | 2013059765 A1 | 4/2013 |
| WO | 2013138209 A1 | 9/2013 |
| WO | 2016022909 A1 | 2/2016 |

OTHER PUBLICATIONS

Translation of JP 2004-256776, Sep. 16, 2004. (Year: 2004).*

* cited by examiner

*Primary Examiner* — Hui H Chin
(74) *Attorney, Agent, or Firm* — Osha Bergman Watanabe & Burton LLP

(57) ABSTRACT

Disclosed are ethylenically unsaturated salts of allyl (poly) ether sulfates utilized as reactive surfactants or emulsifiers during emulsion polymerization.

21 Claims, 4 Drawing Sheets

| Paint | Latex G | Latex H |
|---|---|---|
| Surfactant | Surfactant B | Comparative D |
| Watermark resistance | 9 | 6 |
| White base paint |  |  |
| Watermark resistance | 8 | 5 |
| Paint tinted paint with 5% colorant |  |  |

POLYMERIZABLE SURFACTANTS HAVING WATER WHITENING RESISTANCE AND METHODS FOR USE

CROSS REFERENCE TO RELATED APPLICATIONS

This application claims priority to U.S. Provisional Application No. 62/842,806 filed on May 3, 2019.

FIELD OF INVENTION

This invention relates to polymerizable surfactants, which are utilized in the preparation of polymers by emulsion polymerization.

BACKGROUND

Surfactants are utilized in a variety of applications for, e.g., dispersion, emulsification, wetting and foaming, across numerous industries such as coatings, adhesives, home care, personal care, construction, paper, inks and the like. Surfactants are often times contained in products such as paints and coatings because they are necessary to stabilize the products or during manufacturing of the product. However, often times, the presence of surfactants in the end products negatively affect desirable properties in such end products. In paints, for example, the presence of excessive surfactants may contribute to increased water-sensitivity and water whitening.

Emulsifiers are surfactants used in the preparation of polymers through a process called emulsion polymerization. Typically, such emulsifiers are understood to affect the mechanical stability and chemical stability, among others, of the resulting emulsions. Further, emulsifiers play a role in physical properties of the emulsions, such as viscosity, particle size, and the like. Emulsifiers also play a role in the physical properties of the films, such as weatherability, durability, and adhesion.

The resulting latex is typically used in coating applications such as paints, inks, stains, pressure sensitive adhesives ("PSA"), etc. Once the latex-containing product has been applied to a surface as part of a protective or decorative coating, the surfactant is no longer needed or desired. The presence of the surfactant often degrades the moisture sensitivity of the coating. In addition, other coating properties can be negatively affected, such as adhesion to the substrate surface. It is typically understood that this negative effect is largely due to the mobility of the surfactant polymers. For example, locally high concentrations of surfactant molecules can form in the coating from the coalescence of surfactant-coated micelle spheres. When the coating is exposed to water, these unbound surfactant molecules can be extracted from the coating leaving thin spots or pathways to the substrate surface. This can result in a pin-holing effect and attack of the substrate by water. Other undesired effects include whitening, blooming, or blushing in a coating film, which occurs as a result of the film being put in contact with water, causing surfactant to migrate to the surface. As a result, the film can become hazy or whiten, and the film can lose its original sheen.

SUMMARY OF INVENTION

These problems are thought to be attributed to surfactants still remaining as free form in the polymers. One method for lowering the content of such free surfactants is to react such surfactants with polymers during polymerization or otherwise make it so that such surfactants do not remain in free forms in the product or intermediary products, i.e., reactive surfactants or "polymerizable surfactants". It is understood that the term "reactive surfactant(s)" and "polymerizable surfactant(s)" is used interchangeably herein.

In one aspect, described herein are reactive or polymerizable surfactants of formula (I):

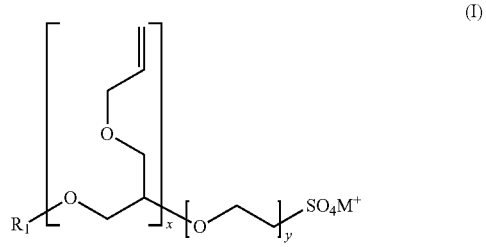

wherein $R_1$ is H, a $C_8$-$C_{14}$ alkyl group, or a bicyclo[$_{d,e,f}$]heptyl or bicyclo[$_{d,e,f}$]heptenyl group wherein d is 2, 3, or 4, e is 1 or 2, f is 0 or 1, and the sum of d+e+f=5, and which may, optionally, be substituted on one or more of the ring carbon atoms by one or more ($C_1$-$C_6$)alkyl groups (otherwise referred to herein as "Nopol");

"x" is an integer from 1-5 and "y" is an integer from 5-15; and

M+ is, but is not limited to, H+, Na+, $NH_4$+, K+ or Li+.

In another embodiment, $R_1$ is H, a group according to formula (II) (otherwise referred to herein as "Nopol"), or a linear or branched: $C_1$-$C_{50}$ alkyl group, $C_1$-$C_{40}$ alkyl group, $C_2$-$C_{30}$ alkyl group, $C_4$-$C_{20}$ alkyl group, $C_6$-$C_{20}$ alkyl group, $C_8$-$C_{14}$ alkyl group, or $C_6$-$C_{18}$ alkyl group. In another embodiment, "x" is an integer from 1-20 and "y" is an integer from 1-50, provided that x+y is greater or equal to 1. In another embodiment, "x" is an integer from 0-40 and "y" is an integer from 0-40.

In yet another embodiment, M+ is H+, Na+, $NH_4$+, K+ or Li+. In one preferred embodiment, M+ is Na+ or $NH_4$+. In a more preferred embodiment, M+ is $NH_4$+

In another aspect, described herein are methods of preparing a polymer (including but not limited to latex polymer emulsions and paints) utilizing the reactive surfactant of formula (I) above as an emulsifier. In another aspect, described herein are methods of preparing a polymer (including but not limited to latex polymer emulsions and paints) utilizing a polymerizable surfactant composition (or reactive surfactant composition) of formula (I) as an emulsifier in combination with at least one surfactant. In one embodiment, the surfactant is sodium alkylbenzene sulfonates, alkyl sulfosuccinates, alkyldiphenyloxide disulfonates, ethoxylated alkylphenol sulfates and phosphates, sulfates and phosphates of fatty alcohols. In another embodiment, the surfactant is a $C_{10}$-$C_{16}$ alcohol ethoxylate sulfate or any salt thereof.

DETAILED DESCRIPTION OF INVENTION

Figure 1:
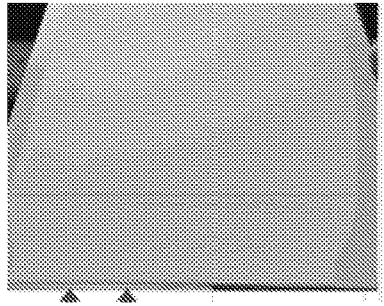
FIG. 1 shows photographs of the improved paint of the invention (white and tinted with 5% colorant) as compared to the prior art.
Figure 1:
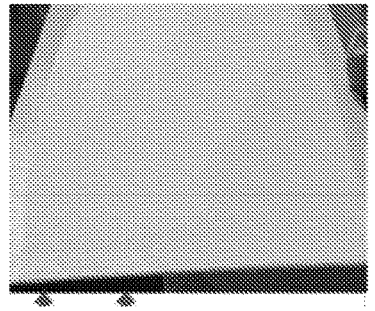
Figure 1:
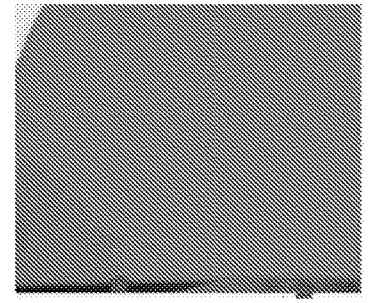
Figure 1:
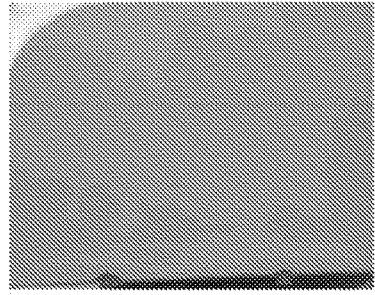

In the summary of the invention and this detailed description, each numerical value should be read once as modified by the term "about" (unless already expressly so modified), and then read again as not so modified unless otherwise indicated in context.

As used herein, the term "alkyl" means a saturated hydrocarbon radical, which may be straight, branched or cyclic, such as, for example, methyl, ethyl, n-propyl, isopropyl, n-butyl, sec-butyl, t-butyl, pentyl, n-hexyl, cyclohexyl.

As used herein, the term "cycloalkyl" means a saturated hydrocarbon radical that includes one or more cyclic alkyl rings, such as, for example, cyclopentyl, cyclooctyl, and adamantanyl.

As used herein, the term "hydroxyalkyl" means an alkyl radical, more typically an alkyl radical, that is substituted with a hydroxyl groups, such as for example, hydroxymethyl, hydroxyethyl, hydroxypropyl, and hydroxydecyl.

As used herein, the term "alkylene" means a bivalent acyclic saturated hydrocarbon radical, including but not limited to methylene, polymethylene, and alkyl substituted polymethylene radicals, such as, for example, dimethylene, tetramethylene, and 2-methyltrimethylene.

As used herein, the term "alkenyl" means an unsaturated straight chain, branched chain, or cyclic hydrocarbon radical that contains one or more carbon-carbon double bonds, such as, for example, ethenyl, 1-propenyl, 2-propenyl.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkenyl, halo, haloalkyl, or amino, such as, for example, phenoxy, phenyl, methylphenyl, dimethylphenyl, trimethylphenyl, chlorophenyl, trichloromethylphenyl, aminophenyl.

As used herein, the term "aralkyl" means an alkyl group substituted with one or more aryl groups, such as, for example, phenylmethyl, phenylethyl, triphenylmethyl.

As used herein, the terminology "($C_n$-$C_m$)" in reference to an organic group, wherein n and m are each integers, indicates that the group may contain from n carbon atoms to m carbon atoms per group.

As used herein, the terminology "ethylenic unsaturation" means a terminal (that is, e.g., α, β) carbon-carbon double bond.

Emulsion polymerization is typically utilized in preparing aqueous latexes used in coatings such as paints and inks. The polymerization reaction generally occurs in micelles where the monomer droplet is stabilized by surfactants. The surfactant often times is an anionic surfactant of a mixture of anionic surfactant with nonionic surfactant, under conditions that promote polymerization. These surfactants, along with reaction conditions, determine properties of the polymer such as particle size. For example, anionic surfactants can provide shear stability to prevent loss due to coagulation. Nonionic surfactants can provide electrolyte or chemical stability to the growing latex particles. The type and structure of a surfactant can have a dramatic effect on emulsion properties such as particle size, particle size distribution, and latex viscosity.

Like non-polymerizable surfactants, polymerizable surfactants are molecules that typically have a hydrophobic segment and an ionizable and/or polar group. The hydrophobic segment preferentially adsorbs onto the surface of the polymer particle (e.g., latex polymer particle) during and following particle polymerization. The hydrophilic group extends into the aqueous solution phase and provides a steric barrier or charge repulsion against particle agglomeration and coagulation.

However, unlike their non-polymerizable counterparts, polymerizable surfactants additionally contain a reactive group on the hydrophobic segment that is capable of covalently bonding to the latex surface. Usually this is a moiety such as terminal unsaturated carbon group(s), such as vinyl or an olefin group(s), which can participate in free-radical emulsion polymerization reactions. When used in emulsion polymerization, a large fraction of the surfactant molecules become irreversibly bound to the emulsion polymer chains and droplets. This can improve both the latex stability and reduce foaming, amongst other desirable properties.

The polymerizable surfactants as described herein are prepared from readily-available raw materials, and generally their preparation does not require any equipment or special handling. The polymerizable surfactants described herein may be prepared in a batch mode or a continuous mode. The polymerizable surfactants can be prepared in a variety of forms, including but not limited to, liquids, solutions, flakes, powders, solids, semi-solids, gels, ringing gels, or pastes. In one embodiment, the polymerizable surfactants are prepared in a conventional solvent such as water, solvent (such as an alcohol), or a mixture thereof, to produce an aqueous solution of the polymerizable surfactant. In one embodiment, the polymerizable surfactant as described herein also encompasses surfactants as salts in dry form, and in another embodiment, the polymerizable surfactant as described herein also encompasses surfactants as aqueous solutions. Salts of the polymerizable surfactants may be isolated by drying a solution of the polymerizable surfactants. A solution of polymerizable surfactants can be prepared by dissolving the salt of the polymerizable surfactant in water, solvent, or a mixture thereof.

The coatings, including PSAs, are obtained from an aqueous dispersion comprising an effective amount of surfactant comprising at least one ionic polymerizable surfactant. Coatings comprised of the at least one polymerizable surfactant show better water whitening resistance in hot water (90° C.) whitening test. In one embodiment, specifically, $C_{12}$/$C_{14}$-2.6AGE-5EO-sulfate sodium salt, $C_{12}$/$C_{14}$-2.6AGE-15EO-sulfate sodium salt and Nopol-2.6AGE-15EO-sulfate sodium salt exemplifies improved hot water whitening resistance in comparison to nonreactive regular surfactants. As used herein, "AGE" is allyl glycidyl ether.

In one embodiment, the Nopol-2.6AGE-15EO-sulfate sodium salt is represented as follows:

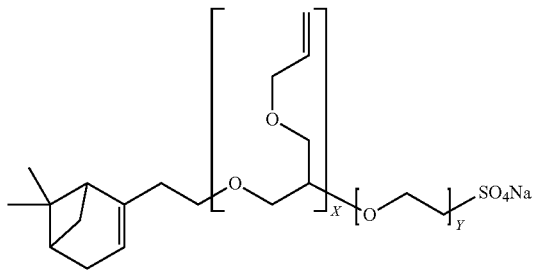

wherein "x" is an integer from 1-30, or 1-25, or 1-20, or 1-15, or 1-10, or 1-5; and "y" is an integer from 1-50, or 1-40, or 1-30, or 1-25, or 1-20, or 1-15, or 1-10, or 1-5, or 3-50, or 3-40, or 3-30, or 3-25, or 3-20, or 3-15, or 3-10, or 3-5, or 5-50, or 5-40, or 5-30, or 5-25, or 5-20, or 5-15, or 5-10, or 5-7.

In one embodiment, specifically, $C_{12}/C_{14}$-2.6AGE-5EO-sulfate ammonium salt, $C_{12}/C_{14}$-2.6AGE-15EO-sulfate ammonium salt and Nopol-2.6AGE-15EO-sulfate ammonium salt exemplifies improved hot water whitening resistance in comparison to nonreactive regular surfactants.

In one embodiment, the Nopol-2.6AGE-15EO-sulfate ammonium salt is represented as follows:

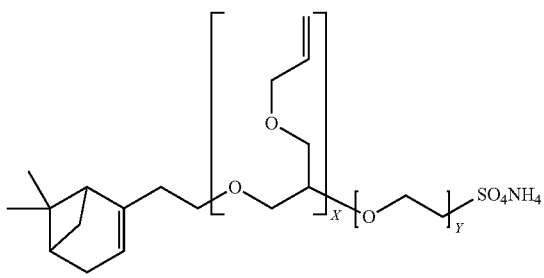

wherein "x" is an integer from 1-30, or 1-25, or 1-20, or 1-15, or 1-10, or 1-5; and "y" is an integer from 1-50, or 1-40, or 1-30, or 1-25, or 1-20, or 1-15, or 1-10, or 1-5, or 3-50, or 3-40, or 3-30, or 3-25, or 3-20, or 3-15, or 3-10, or 3-5, or 5-50, or 5-40, or 5-30, or 5-25, or 5-20, or 5-15, or 5-10, or 5-7.

In one embodiment, the $C_{12}/C_{14}$-2.6AGE-15EO-sulfate sodium salt is represented as follows:

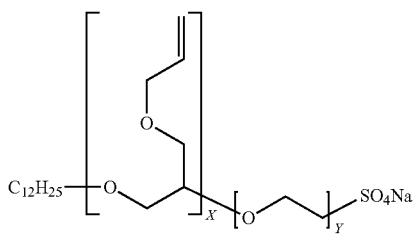

wherein "x" is an integer from 1-30, or 1-25, or 1-20, or 1-15, or 1-10, or 1-5; and "y" is an integer from 1-50, or 1-40, or 1-30, or 1-25, or 1-20, or 1-15, or 1-10, or 1-5, or 3-50, or 3-40, or 3-30, or 3-25, or 3-20, or 3-15, or 3-10, or 3-5, or 5-50, or 5-40, or 5-30, or 5-25, or 5-20, or 5-15, or 5-10, or 5-7.

In one embodiment, the $C_{12}/C_{14}$-2.6AGE-15EO-sulfate ammonium salt is represented as follows:

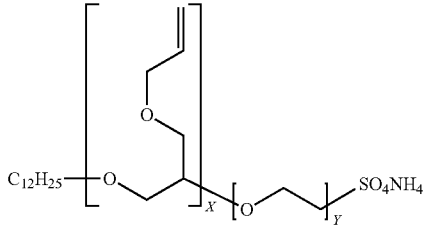

wherein "x" is an integer from 1-30, or 1-25, or 1-20, or 1-15, or 1-10, or 1-5; and "y" is an integer from 1-50, or 1-40, or 1-30, or 1-25, or 1-20, or 1-15, or 1-10, or 1-5, or 3-50, or 3-40, or 3-30, or 3-25, or 3-20, or 3-15, or 3-10, or 3-5, or 5-50, or 5-40, or 5-30, or 5-25, or 5-20, or 5-15, or 5-10, or 5-7.

The polymerizable surfactants as described herein can be used for applications in which reactive surfactants containing one or more polyether groups have been used to date, specifically as emulsifiers for emulsion polymerization, dispersants for suspension polymerization, resin modifiers (for improvements in water repellency, adjustments in hydrophilicity, improvements in antistatic properties, improvements in anti-fogging properties, improvements in waterproofness, improvements in adhesion properties, improvements in dyeability, improvements in film-forming properties, improvements in weatherability, improvements in anti-blocking properties, etc.), fiber processing aids, non-dripping agents, soil resistance finishes, paints, and the like.

When any one of the polymerizable surfactants as described herein is used as an emulsifier for emulsion polymerization, it can be used in any desired proportion within a proportion range with other emulsifiers (surfactants) for emulsion polymerization. In general, however, it can be used preferably in a proportion of from 0.1 to 20 wt. %, typically, in a proportion of from 0.2 to 10 wt. % based on the raw material monomer or monomers, and in other embodiment, in a proportion of from 0.2 to 5 wt. % based on the raw material monomer or monomers. Further, in another embodiment, surfactants aside from the polymerizable surfactant as described herein can be utilized during the emulsion polymerization process. Non-reactive surfactants that are commonly used in the emulsion polymerization process include both anionic and nonionic molecules. In one embodiment, the reactive surfactant as described herein can be utilized with one or more anionic surfactants. In one embodiment, the reactive surfactant as described herein can be utilized with one or more cationic surfactants. In one embodiment, the reactive surfactant as described herein can be utilized with one or more non-ionic surfactants. In one embodiment, the reactive surfactant as described herein can be utilized any combination of one or more anionic surfactants and one or more non-ionic surfactants.

Anionic surfactants used in connection with the reactive surfactants as described herein (in the emulsion polymerization process) are as follows: sodium alkylbenzene sulfonates, alkyl sulfosuccinates, alkyldiphenyloxide disulfonates, ethoxylated alkylphenol sulfates and phosphates, sulfates and phosphates of fatty alcohols, and the like, or any salt thereof. Non-ionic surfactants used in connection with the reactive surfactants as described herein (in the emulsion polymerization process) are as follows: alcohol ethoxylates, alkylphenol ethoxylates, and the like, or any salt thereof. In one embodiment. The anionic surfactant is a $C_{10-16}$ alcohol ethoxylate sulfate, or any salt thereof.

Although no particular limitation is imposed on the monomer(s) to be subjected to emulsion polymerization, the polymerizable surfactant utilized for emulsion polymerization can be used preferably for acrylate emulsions, styrene emulsions, vinyl acetate emulsions, SBR (styrene/butadiene) emulsion, ABS (acrylonitrile/butadiene/styrene) emulsion, BR (butadiene) emulsion, IR (isoprene) emulsion, NBR (acrylonitrile/butadiene) emulsion, and the like.

Suitable monomers that may be polymerized under emulsion polymerization conditions as described herein include ethylenically unsaturated monomers, for example, vinyl monomers and acrylic monomers. Typical vinyl monomers suitable for use include, but are not limited to, vinyl esters such as vinyl acetate, vinyl benzoate, vinyl propionate; vinyl aromatic hydrocarbons such as styrene, methyl styrenes, other vinyl aromatics such as vinyl toluenes, vinyl naphthalenes, divinyl benzene, and the like. Halogenated vinyl monomers such as vinyl chloride, vinylidene chloride, etc. may also be used.

Suitable acrylic monomers typically include compounds with acrylic functionality such as alkyl acrylates and methacrylates, acrylate acids and methacrylate acids as well as acrylamides and acrylonitrile. Typical acrylic monomers include, but are not limited to methyl acrylate and methyl methacrylate, ethyl, propyl, and butyl acrylate and methacrylate, benzyl acrylate and methacrylate, cyclohexyl acrylate and methacrylate, decyl and dodecyl acrylate and methacrylate, etc. Other acrylic monomers include hydroxy alkyl acrylates and methacrylates such as hydroxypropyl and hydroxyethyl acrylate and methacrylate, acrylic acids such as methacrylic and acrylic acid, and amino acrylates and methacrylates.

Other examples of (co)polymerizable monomers in the acrylate emulsions can include (meth)acrylic acid (acrylate) alone, (meth)acrylic acid (acrylate)/styrene, (meth)acrylic acid (acrylate)/vinyl acetate, (meth)acrylic acid (acrylate)/acrylonitrile, (meth)acrylic acid (acrylate)/butadiene, (meth)acrylic acid (acrylate)/vinylidene chloride, (meth)acrylic acid (acrylate)/allylamine, (meth)acrylic acid (acrylate)/vinylpyridine, (meth)acrylic acid (acrylate)/alkylolamides, (meth)acrylic acid (acrylate)/N,N-dimethylaminoethyl esters, and (meth)acrylic acid (acrylate)/N,N-diethylaminoethyl vinyl ether.

Other additives or components which are known to those skilled in the art may also be used in accordance with the present invention. These include chain transfer agents, which are used to control molecular weight, additives to adjust pH, and compounds utilized as protective colloids which provide additional stability to the latex particles.

In one embodiment, the polymerizable surfactant is of formula (I):

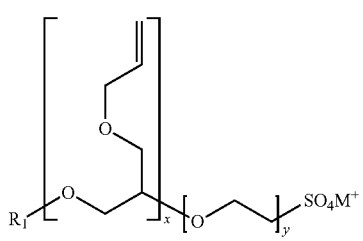

(I)

wherein $R_1$ is H or $C_8$-$C_{14}$ alkyl group; "x" is an integer from 1-5; "y" is an integer from 5-15; and M+ is H+, Na+, NH$_4$+, K+ or Li+, preferably M+ is Na+ or NH$_4$+. In certain embodiments, the polymerizable surfactant can be a mixture of two or more surfactants of formula (I), wherein $R_1$ is two different $C_8$-$C_{14}$ alkyl groups, and wherein "x" is an integer from 1-5; "y" is an integer from 5-15; and M+ is H+, Na+, NH$_4$+, K+ or Li+, preferably M+ is Na+ or NH$_4$+. For instance, in certain embodiments, the polymerizable surfactant can be a mixture of two or more surfactants of formula (I), wherein at least one surfactant of formula (I) has $R_1$ that is a $C_8$-$C_{14}$ alkyl group, preferably a $C_{10}$-$C_{14}$ alkyl group, and wherein at least one different surfactant of formula (I) has $R_1$ that is a different $C_8$-$C_{14}$ alkyl group, preferably a different $C_{10}$-$C_{14}$ alkyl group, and wherein "x" is an integer from 1-5; "y" is an integer from 5-15; and M+ is H+, Na+, NH$_4$+, K+ or Li+, preferably M+ is Na+ or NH$_4$+.

In one embodiment, $R_1$ is a bicyclo$_{[d.e.f]}$heptyl or bicyclo$_{[d.e.f]}$heptenyl group wherein d is 2, 3, or 4, e is 1 or 2, f is 0 or 1, and the sum of d+e+f=5, and which may, optionally, be substituted on one or more of the ring carbon atoms by one or more $(C_1$-$C_6)$alkyl groups (otherwise referred to herein as "Nopol").

In another embodiment, $R_1$ is a bicyclic group, or more specifically in one embodiment, a bicycloheptyl-polyether, bicycloheptenyl-polyether or branched $(C_5$-$C_{50})$alkyl-polyether group, wherein the bicycloheptyl-polyether or bicycloheptenyl-polyether group may, optionally, be substituted on one or more ring carbon atoms by one or two $(C_1$-$C_6)$alkyl groups per carbon atom.

In one embodiment, R1 is a linear or branched: $C_1$-$C_{50}$ alkyl group, $C_1$-$C_{40}$ alkyl group, $C_2$-$C_{30}$ alkyl group, $C_4$-$C_{20}$ alkyl group, $C_6$-$C_{20}$ alkyl group, $C_8$-$C_{14}$ alkyl group, or $C_6$-$C_{18}$ alkyl group.

In another embodiment, "x" is an integer from 1-30, or 1-25, or 1-20, or 1-15, or 1-10, or 1-5.

In another embodiment "y" is an integer from 1-50, or 1-40, or 1-30, or 1-25, or 1-20, or 1-15, or 1-10, or 1-5, or 3-50, or 3-40, or 3-30, or 3-25, or 3-20, or 3-15, or 3-10, or 3-5, or 5-50, or 5-40, or 5-30, or 5-25, or 5-20, or 5-15, or 5-10, or 5-7.

In another embodiment, M+ is, but is not limited to, H+, Na+, NH$_4$+, K+ or Li+. In one preferred embodiment, M+ is Na+ or NH4+. In a more preferred embodiment, M+ is NH4+.

In another embodiment, $R_1$ is bicyclo$_{[d.e.f]}$heptyl or bicyclo$_{[d.e.f]}$heptenyl, wherein d is 2, 3, or 4, e is 1 or 2, f is 0 or 1, and the sum of d+e+f=5, and which may, optionally, be substituted on one or more of the ring carbon atoms by one or more $(C_1$-$C_6)$alkyl groups.

More typically, $R_1$ is:
(i) a bicyclo$_{[3.1.1]}$heptyl or bicyclo$_{[3.1.1]}$heptenyl group that is bonded via its carbon atom at the 2-position and is typically substituted on its carbon atom at the 6-position by one or two $(C_1$-$C_6)$alkyl radicals, more typically by two methyl radicals, or
(ii) a bicyclo$_{[3.1.1]}$heptyl or bicyclo$_{[2.2.1]}$heptenyl group that is bonded via its carbon atom at the 2-position or 3-position and is typically substituted on its carbon atom at the 7 position by one or two $(C_1$-$C_6)$alkyl radicals, more typically by two methyl radicals.

Suitable bicyclic groups include bicycloheptyl- and bicycloheptenyl-moieties may be derived from, for example, terpenic compounds having core (non-substituted) 7 carbon atom bicyclic ring systems according to structures (XII)-(XVII):

(XII)

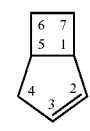

[3.2.0]

(XIII)

[2.2.1]

(XIV)

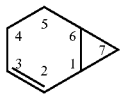

[4.1.0]

(XV)

[3.1.1]

(XVI)

[3.1.1]

(XIV)

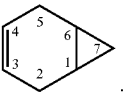

[4.1.0]

For example, a bicycloheptenyl intermediate compound (II), also known as "Nopol":

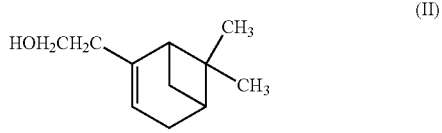

(II)

is made by reacting β-pinene with formaldehyde, and a bicycloheptyl intermediate compound (XIX), known as "Arbanol:

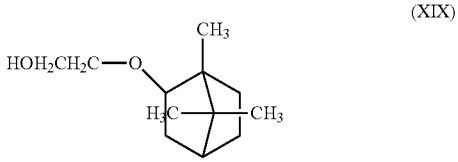

(XIX)

is made by isomerization of α-pinene to camphene and ethoxyhydroxylation of the camphene.

In one embodiment, a bicycloheptyl- or bicycloheptenyl-intermediate is alkoxylated by reacting the bicycloheptyl- or bicycloheptenyl intermediate with one or more alkylene oxide compounds, such as ethylene oxide or propylene oxide, to form a bicycloheptyl-, or bicycloheptenyl-polyether intermediate. The alkoxylation may be conducted according to well-known methods, typically at a temperature in the range of about 100° to about 250° C. and at a pressure in the range of from about 1 to about 4 bars, in the presence of a catalyst, such as a strong base, an aliphatic amine, or a Lewis acid, and an inert gas, such as nitrogen or argon.

The bicycloheptyl-, or bicycloheptenyl-polyether monomer is then formed by addition of a polymerizable functional group to the bicycloheptyl- or bicycloheptenyl-polyether intermediate, by, for example, esterification, under suitable reaction conditions, of the bicycloheptyl- or bicycloheptenyl-polyether intermediate with, for example, methacrylic anhydride.

In some embodiments, sulfate group or phosphate group includes their corresponding salt forms, wherein the cation includes but not limited to Na+, NH4+, K+ or Li+.

In another embodiment, M+ is, but is not limited to, H+, Na+, NH4+, K+ or Li+. In a typical embodiment, M+ is Na+ or NH4+. In a preferred embodiment, M+ is NH4+.

The use of reactive surfactants as described herein in emulsion polymerization imparts at least one of the following benefits to a latex and/or coating application: whitening resistance, high temp whitening resistance, medium reactivity, PME stability, good process control, and excellent application performance (e.g., water sensitivity).

Polymerizable surfactant compositions (or reactive surfactant compositions) can comprise any reactive surfactant according to formula (I) as an emulsifier in combination with at least one surfactant. In one embodiment, the surfactant is sodium alkylbenzene sulfonates or any salt thereof, alkyl sulfosuccinates or any salt thereof, alkyldiphenyloxide disulfonates or any salt thereof, ethoxylated alkylphenol sulfates or any salt thereof, ethoxylated alkylphenol phosphates or any salt thereof, sulfates and phosphates of fatty alcohols or any salt thereof. In another embodiment, the surfactant is an alkyl alcohol ethoxylate sulfate or any salt thereof.

EXAMPLES

Preparation of Polymerizable Surfactants

Example 1. Preparation of Polymerizable Surfactant $C_{12}C_{14}$-2.6AGE-15EO Sulfate Ammonium Salt 10.0 g 45% potassium hydroxide solution was added to 320 g of Alfol 1214 stirring at 80° C. in a reactor with a sub-surface purge of nitrogen gas. After heating to 100° C., the gas flow was stopped and a vacuum pump was used to evacuate the flask by approximately 20"Hg. One hour later the vacuum was broken with nitrogen and a sample was analyzed by Karl-Fischer Titration to be 0.09% water content.

470.1 g allyl glycidyl ether was added to the reactor over 120 minutes within a temperature range of 95-105° C. 30 minutes later the reactor contents were heated to 120° C. After a further six hours within a temperature range of 120-123° C. a sample of the reactor contents was titrated to naptholbenzein indicator with 0.1M perchloric acid in acetic acid and showed 0.101 mmol/g alkalinity in the presence of tetrabutylammonium bromide indicating complete reaction of the added epoxy compound. 780 g clear liquid product was recovered from the reactor.

360 g of the previously described adduct was charged to an agitated autoclave reactor and heated to 110° C. with a sub-surface purge of nitrogen gas. The reactor was evacuated by approximately 27"Hg and held at those conditions for 30 minutes. After breaking the vacuum with nitrogen and applying a positive pressure of 1.1 bars nitrogen, the reactor contents were heated to 155° C. then 541 g ethylene oxide were fed below the surface of the liquid over 140 minutes between 155-156° C. reaching a maximum pressure of 5.3 bars. One hour later the pressure was released and the reactor contents were cooled to 115° C. before purging once more with nitrogen gas for 10 minutes before discharge. 889 g clear liquid product was recovered from the reactor.

647.3 g of the previously described adduct was charged to a 1 liter reactor followed by stirring at 350 RPM, initiation of a ~25 ml/min nitrogen sparge and heating to 65° C. Dicyandiamide (0.36 g) was charged to the reactor followed by a 1 hour sparge to help reduce/remove dissolved oxygen, which contributes to color. 71.13 g of sulfamic acid was charged to the reactor over one hour by dividing the charge into 5 nearly equal additions. The reaction temperature was increased to 90° C. where it was maintained for 5 hours. The reaction mass was cooled to <40° C. and the dark amber liquid was bottled. The % actives was determined by use of a Hyamine test.

1172.22 g of deionized water was charged to a two gallon open-top reaction flask with stainless steel turbine agitator. Stirring was initiated at 350 RPM. 18.5 g of 29% ammonium hydroxide was charged to the stirring water. 524.9 g of the previously described adduct, with an actives level of 100% by Hyamine test, was slowly charged to the water in a steady stream, while ensuring the pH remained >7. An additional 231 g of deionized water was charged to give an estimated 27% actives solution. The agitation was maintained for 30 minutes. The clear, amber liquid was bottled. The % actives was determined to be 29.6%.

Example 2. Preparation of Polymerizable Surfactant Nopol-2.6AGE-15EO Sulfate Ammonium Salt 11.1 g 45% potassium hydroxide solution was added to 283 g of Nopol stirring at 100° C. in a reactor with a sub-surface purge of nitrogen gas. The gas flow was stopped and a vacuum pump was used to evacuate the flask by approximately 22"Hg. One hour later the vacuum was broken with nitrogen and a sample analyzed by Karl-Fischer Titration to be 0.06% water content.

505.8 g allyl glycidyl ether was added to the reactor over 120 minutes within a temperature range of 93-96° C. 30 minutes later the reactor contents were heated to 120° C. After a further five hours within a temperature range of 118-120° C., a sample of the reactor contents was titrated to naptholbenzein indicator with 0.1M perchloric acid in acetic acid and showed 0.125 mmol/g alkalinity in the presence of tetrabutylammonium bromide indicating essentially complete reaction of the added epoxy compound (2% molar residual epoxy=98% molar conversion of allyl glycidyl ether). 773 g clear liquid product was recovered from the reactor.

351 g of the previously described adduct was charged to an agitated autoclave reactor and heated to 110° C. with a sub-surface purge of nitrogen gas. The reactor was evacuated by approximately 27"Hg and held at those conditions for 30 minutes. After breaking the vacuum with nitrogen and applying a positive pressure of 1.0 bars nitrogen the reactor contents were heated to 155° C. then 546 g ethylene oxide were fed below the surface of the liquid over 130 minutes between 155-156° C. reaching a maximum pressure of 5.6 bars. One hour later the pressure was released and the reactor contents were cooled to 110° C. before purging once more with nitrogen gas for 10 minutes before discharge. 876 g clear liquid product was recovered from the reactor.

691.4 g of the previously described adduct was charged to a 1 liter reactor followed by stirring at 350 RPM, initiation of an ~25 ml/min nitrogen sparge and heating to 65° C. Dicyandiamide (0.39 g) was charged to the reactor followed by a 1 hour sparge to help reduce/remove dissolved oxygen, which contributes to color. 84.65 g of sulfamic acid was charged to the reactor over one hour by dividing the charge into 5 nearly equal additions. The reaction temperature was increased to 90° C. where it was maintained for 5 hours. The reaction mass was cooled to <40° C. and bottled. The % actives was determined by use of a Hyamine test for use in the dilution to the desired % actives of 30%.

1165.61 g of deionized water was charged to a two gallon open-top reaction flask with stainless steel turbine agitator. Stirring was initiated at 350 RPM. 16.0 g of 29% ammonium hydroxide was charged to the stirring water yielding a pH of 10.62. 529.5 g of the previously described adduct, with an actives level of 99.8% by Hyamine test, was slowly charged to the water in a steady stream, while ensuring the pH remained >7. An additional 50.2 g of deionized water was charged to give an approximately 30% actives solution. The agitation was maintained for 30 minutes. The clear, amber liquid was bottled. The % actives was determined to be 30.5%.

Examples 3 to 9. The polymerizable surfactants A-I in Examples 1-9—shown in TABLE 1 were prepared by following the procedure described in Example 1 with adjusted molar ratio of starting raw materials accordingly.

TABLE 1

Polymerizable surfactants in Example 1-9

| Example | Sample ID | Description | Solids |
|---------|-----------|-------------|--------|
| Example 1 | Surfactant A | $C_{12-14}$-2.6AGE-15EO-Sulfate | 29.10% |
| Example 2 | Surfactant B | Nopol-2.6AGE-15EO-Sulfate | 29.27% |
| Example 3 | Surfactant C | $C_{12-14}$-1.3AGE-5EO-Sulfate | 34.30% |
| Example 4 | Surfactant D | $C_{12-14}$-1.3AGE-10EO-sulfate | 31.89% |
| Example 5 | Surfactant E | $C_{12-14}$-1.3AGE-15EO-Sulfate | 33.45% |
| Example 6 | Surfactant F | $C_{12-14}$-2.6AGE-5EO-Sulfate | 33.23% |
| Example 7 | Surfactant G | $C_{12-14}$-2.6AGE-10EO-sulfate | 31.18% |
| Example 8 | Surfactant H | Nopol-2.6AGE-5EO-Sulfate | 29.87% |
| Example 9 | Surfactant I | Nopol-2.6AGE-10EO-sulfate | 30.39% |

Example 10. Preparation of Latex Polymer by Using Surfactant a in an all Acrylic Emulsion Polymerization De-ionized water (230.0 g) and the polymerizable Surfactant A (29.10% solids, 3.2 g) were added to a suitable reactor for emulsion polymerization equipped with agitation, heating and cooling means with a slow continuous nitrogen purge. Under continuous agitation, the temperature of the reactor was raised to 80° C. At 80° C., a monomer pre emulsion (26.07 g) [5.0% of a total pre-emulsion prepared by mixing water (115 g) polymerizable Surfactant A (5.8 g), methyl methacrylate (40 g), 2-ehtylhexyl acrylate (296 g), acrylic acid (12 g), Sipomer BCEA (4 g), and chain transfer agent (0.5 g), and adjusted with ammonia (6.4 g)], was added to the reactor. Once the temperature of the reactor had stabilized at 80° C. A 5% solution of ammonium persulfate (0.5 g dissolved in deionized water (10 g) was added to the reactor.

Twenty five minutes later a sample was taken from the reactor for particle size analysis. The seed particle size was at 79.5 nm. Five minutes later continuous addition of the remaining monomer pre-emulsion and initiators solution (1 g dissolved in 100 g deionized water) started for 3 hours with temperature at 80° C. Monomer pre-emulsion was completed for addition in over 2 hours and 45 minutes. The initiator addition was completed in 3 hour. The reactor was kept at 80° C. for further 30 minutes until the values of the final solids were constant or near maximum theoretical value. The polymer dispersion obtained had a solid content of 44.51%, and the average particle size was 137.9 d·nm. The reactor was cooled below 40° C. and the resulting latex was filtered through a 200 um polyester filter. The latex properties were given in TABLE 2.

Example 11. Preparation of latex polymers by using polymerizable surfactant samples prepared in Example 2 to 9 by following the similar procedure described in Example 10, and the latex recipes are set forth in TABLE 2.

Comparative Example 12. Preparation of Latex Polymers by Using Comparative Non-Polymerizable Surfactants The polymerization recipe is listed in TABLE 3 and process is similar to that of Example 10. Traditional non-polymerizable surfactants were used, RHODACAL DS-10 (sodium dodecylbenzene sulfate, Comparative sample A), and RHODAFAC PA12 (Oleyl ether ethoxylated phosphate, Comparative sample B). The latex properties are listed in TABLE 4.

TABLE 3

| Recipe of comparative surfactants (in grams) | | |
|---|---|---|
| | Comparative A | Comparative B |
| Kettle charge | | |
| DI Water | 230.0 | 227.6 |
| Comparative A | 1.0 | |
| Comparative B | | 5.0 |

TABLE 2

| Recipe of latex polymers (in grams) | | | | | | | | | |
|---|---|---|---|---|---|---|---|---|---|
| Kettle charge | | | | | | | | | |
| DI Water | 230.0 | 230.0 | 230.0 | 230.0 | 230.0 | 230.0 | 230.0 | 230.0 | 230.0 |
| Surfactant A | 3.2 | | | | | | | | |
| Surfactant B | | 3.4 | | | | | | | |
| Surfactant C | | | 2.8 | | | | | | |
| Surfactant D | | | | 3.1 | | | | | |
| Surfactant E | | | | | 3.0 | | | | |
| Surfactant F | | | | | | 3.1 | | | |
| Surfactant G | | | | | | | 3.2 | | |
| Surfactant H | | | | | | | | 3.3 | |
| Surfactant I | | | | | | | | | 3.3 |
| Catalyst I | | | | | | | | | |
| Ammonium persulfate | 0.5 | 0.5 | 0.5 | 0.5 | 0.5 | 0.5 | 0.5 | 0.5 | 0.5 |
| DI Water | 10.0 | 10.0 | 10.0 | 10.0 | 10.0 | 10.0 | 10.0 | 10.0 | 10.0 |
| Monomer | | | | | | | | | |
| D. Water | 115.0 | 115.0 | 115.0 | 115.0 | 115.0 | 115.0 | 115.0 | 115.0 | 115.0 |
| Surfactant A | 5.8 | | | | | | | | |
| Surfactant B | | 6.1 | | | | | | | |
| Surfactant C | | | 5.1 | | | | | | |
| Surfactant D | | | | 5.7 | | | | | |
| Surfactant E | | | | | 5.4 | | | | |
| Surfactant F | | | | | | 5.6 | | | |
| Surfactant G | | | | | | | 5.8 | | |
| Surfactant H | | | | | | | | 6.1 | |
| Surfactant I | | | | | | | | | 5.9 |
| MMA | 40.0 | 40.0 | 40.0 | 40.0 | 40.0 | 40.0 | 40.0 | 40.0 | 40.0 |
| 2EHA | 296.0 | 296.0 | 296.0 | 296.0 | 296.0 | 296.0 | 296.0 | 296.0 | 296.0 |
| EA | 48.0 | 48.0 | 48.0 | 48.0 | 48.0 | 48.0 | 48.0 | 48.0 | 48.0 |
| AA | 12.0 | 12.0 | 12.0 | 12.0 | 12.0 | 12.0 | 12.0 | 12.0 | 12.0 |
| B-CEA | 4.0 | 4.0 | 4.0 | 4.0 | 4.0 | 4.0 | 4.0 | 4.0 | 4.0 |
| Chain transfer agent | 0.5 | 0.5 | 0.5 | 0.5 | 0.5 | 0.5 | 0.5 | 0.5 | 0.5 |
| Flush | 17.0 | 16.4 | 18.1 | 17.2 | 17.6 | 17.3 | 17.0 | 16.6 | 16.8 |
| Catalyst II | | | | | | | | | |
| D. water | 100.0 | 100.0 | 100.0 | 100.0 | 100.0 | 100.0 | 100.0 | 100.0 | 100.0 |
| Ammonium persulfate | 1.0 | 1.0 | 1.0 | 1.0 | 1.0 | 1.0 | 1.0 | 1.0 | 1.0 |
| Neutralizer | | | | | | | | | |
| D. water | 13.8 | 13.8 | 13.8 | 13.8 | 13.8 | 13.8 | 13.8 | 13.8 | 13.8 |
| Ammonia | 6.4 | 6.4 | 6.4 | 6.4 | 6.4 | 6.4 | 6.4 | 6.4 | 6.4 |
| Total | 903.2 | 903.1 | 903.2 | 903.2 | 903.2 | 903.2 | 903.2 | 903.2 | 903.2 |

TABLE 3-continued

Recipe of comparative surfactants (in grams)

|  | Comparative A | Comparative B |
|---|---|---|
| Catalyst I | | |
| Ammonium persulfate | 0.5 | 0.5 |
| DI Water | 10.0 | 10.0 |
| Monomer | | |
| D. Water | 115.0 | 106.2 |
| Comparative A | 1.8 | |
| Comparative B | | 9.0 |
| MMA | 40.0 | 40.0 |
| 2EHA | 296.0 | 296.0 |
| EA | 48.0 | 48.0 |
| AA | 12.0 | 12.0 |
| B-CEA | 4.0 | 4.0 |
| Chain transfer agent | 0.5 | 0.5 |
| Flush | 16.6 | 20.0 |
| Catalyst II | | |
| D. water | 100.0 | 100.0 |
| Ammonium persulfate | 1.0 | 1.0 |
| Neutralizer | | |
| D. water | 13.8 | 13.8 |
| Ammonia | 6.4 | 6.4 |
| Total | 896.6 | 900.0 |

TABLE 4

Latex properties

| Sample ID | Surf. C | Surf. D | Surf. E | Surf. F | Surf. G | Surf. A | Surf. H | Surf. I | Surf. B | Comp. A | Comp. B |
|---|---|---|---|---|---|---|---|---|---|---|---|
| Solids actual (%) | 44.69 | 44.49 | 44.51 | 44.39 | 44.72 | 44.51 | 44.47 | 44.78 | 44.76 | 45.02 | 44.78 |
| Conversion (%) | 99.1 | 98.8 | 98.9 | 98.6 | 99.3 | 98.9 | 98.8 | 99.5 | 99.4 | 99.6 | 99.1 |
| pH initial | 7.4 | 7.1 | 7.4 | 7.3 | 7.1 | 7.2 | 7.3 | 7.2 | 7.3 | 7.1 | 7.4 |
| Particle size (nm) | 128.5 | 125.9 | 127.2 | 125.6 | 133 | 137.9 | 127.5 | 136.5 | 138.5 | 135.9 | 133.5 |
| Viscosity (30 rpm) | 992 | 824 | 632 | 324 | 381.3 | 540 | 381.3 | 353.3 | 394.7 | 756 | 685.3 |
| Coagulum, 200 # (%) | 0.003 | 0.003 | 0.001 | 0.001 | 0.002 | 0.003 | 0.002 | 0.001 | 0.002 | 0.015 | 0.073 |

Example 13. Water Whitening and Water Resistance Testing in Pressure Sensitive Adhesive (PSA) Application Latex polymers prepared in Examples 10 to 12 were tested for water whitening and water resistance performance in the PSA applications. Water whitening resistance was measured both at room temperature and high temp water condition (~90° C.).

Water whitening resistance test was performed according to the following test method. Apply latex polymer onto PET film with 90 μm applicator, and dry in 110° C. oven for 3 minutes. The films were let to cool down for overnight. Then the films were soaked in the water bath at room temperature for up to 24 hours and at high temperature condition of 90° C. for up to 50 minutes. Water whitening and water resistance were tested by scale 0 to 5:0 being the worst, 5 being the best. The measurement of water whitening was also evaluated by checking the color delta L value and delta E value changes before and after films soaked in water. The testing results are given in FIGS. 2-5.

Figure 2:
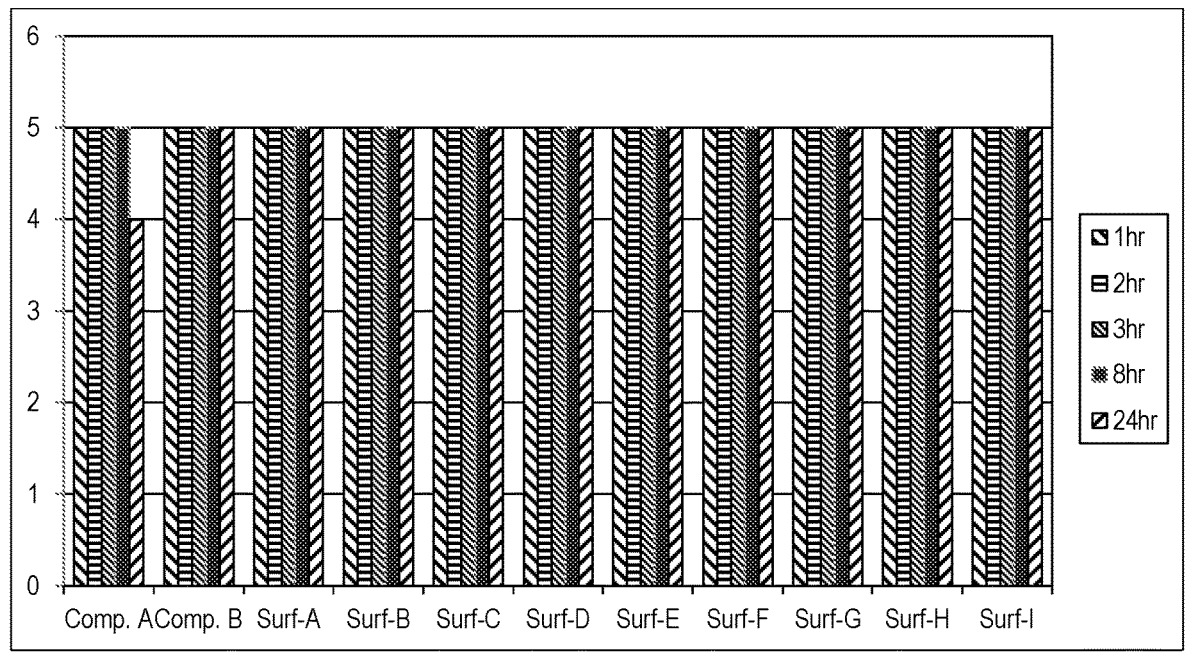
FIG. 2 shows water whitening and water resistance testing at room temperature.

FIG. 2 shows water whitening and water resistance testing at room temperature.

Figure 3:
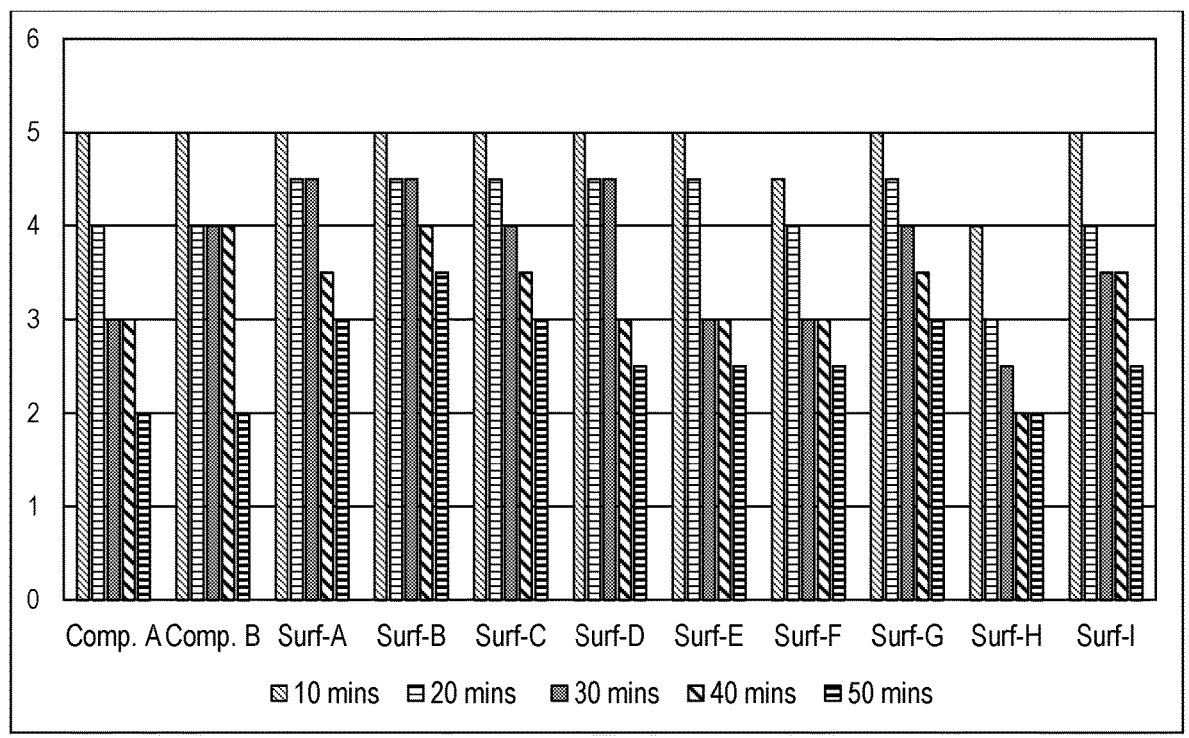
FIG. 3 shows water whitening and water resistance testing at 90° C. condition.

FIG. 3 shows water whitening and water resistance testing at 90° C. condition.

Figure 4:
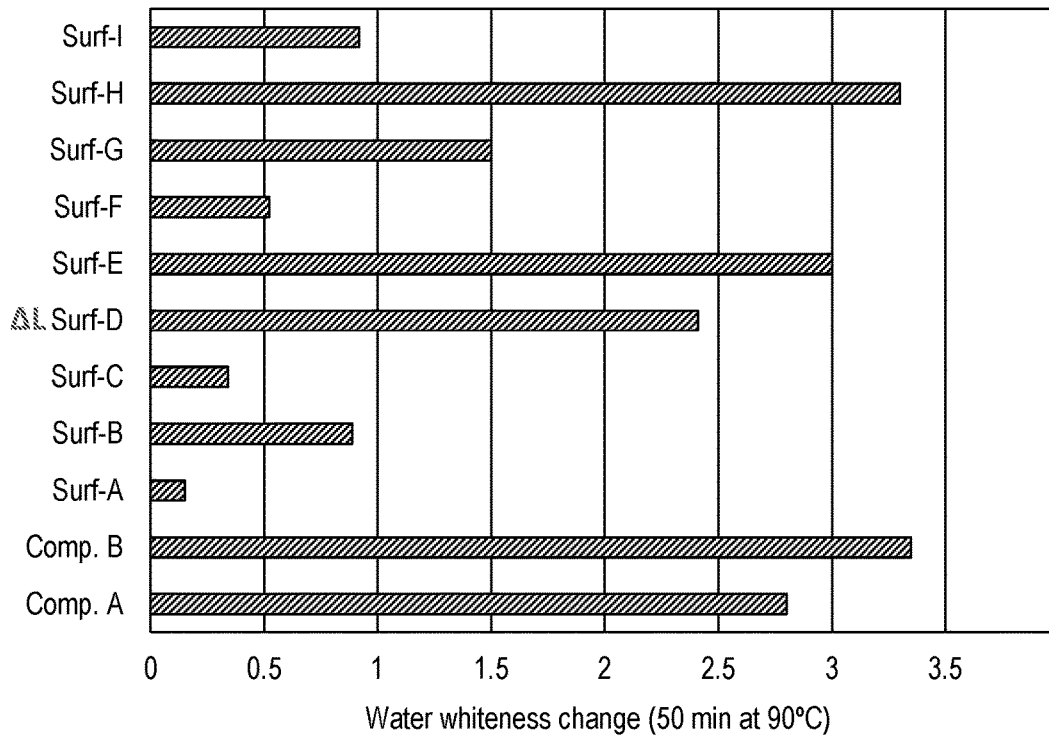
FIG. 4 shows the color delta L value of water whiteness change (50 min at 90° C.) of the examples.

FIG. 4 shows the color delta L value of water whiteness change (50 min at 90° C.) of the examples.

Figure 5:
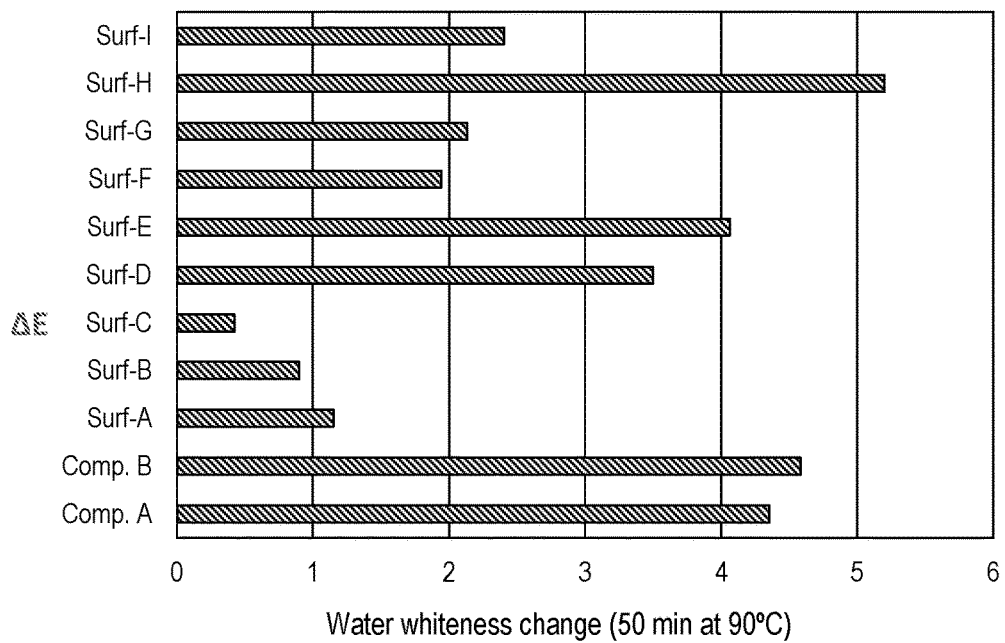
FIG. 5 shows the color delta E value of water whiteness change (50 min at 90° C.) of the examples.

FIG. 5 shows the color delta E value of water whiteness change (50 min at 90° C.) of the examples.

The testing data showed that the polymerizable surfactants prepared by this invention significantly improved the water whitening and water resistance of the latex polymers in pressure adhesive applications compared to traditional surfactants.

Example 14. Preparation of latex polymers by using polymerizable surfactant samples prepared in Example 1 and 2 (Surfactant A and Surfactant B) in a styrene acrylic emulsion polymerization by following the procedure described below. Comparative surfactant samples, comparative sample C (-allyl ethoxylate sulfate sodium salt), comparative sample D (tristyrenephenol EO-PO sulfate sodium salt), and comparative sample E (tristyrenephenol EO phosphate ammonium salt), were also used to prepare latex polymers. The recipe of these latex polymers are given in TABLE 5.

TABLE 5

(in grams)

|  | A | B | C | D | E |
|---|---|---|---|---|---|
| Kettle charge | | | | | |
| DI Water | 240.0 | 233.5 | 234.9 | 235.6 | 232.2 |
| Comparative C | 1.8 | | | | |
| Surfactant A | | 8.3 | | | |
| Surfactant B | | | 6.9 | | |
| Comparative D | | | | 6.2 | |
| Comparative E | | | | | 9.6 |
| Catalyst I | | | | | |
| Ammonium persulfate | 0.5 | 0.5 | 0.5 | 0.5 | 0.5 |
| DI Water | 10.0 | 10.0 | 10.0 | 10.0 | 10.0 |
| Monomer | | | | | |
| D. Water | 155.0 | 149.7 | 151.2 | 147.7 | 148.4 |
| Comparative C | 3.0 | | | | |
| Surfactant A | | 8.3 | | | |
| Surfactant B | | | 6.9 | | |

TABLE 5-continued (in grams)

|  | A | B | C | D | E |
|---|---|---|---|---|---|
| Comparative D |  |  |  | 10.3 |  |
| Comparative E |  |  |  |  | 9.6 |
| Styrene | 194.0 | 194.0 | 194.0 | 194.0 | 194.0 |
| Butyl acrylate | 190.0 | 190.0 | 190.0 | 190.0 | 190.0 |
| Acrylic acid | 10.0 | 10.0 | 10.0 | 10.0 | 10.0 |
| Acrylamide | 6.0 | 6.0 | 6.0 | 6.0 | 6.0 |
| Vinyl trimehoxy silane | 2.0 | 2.0 | 2.0 | 2.0 | 2.0 |
| Flush | 10.0 | 10.0 | 10.0 | 10.0 | 10.0 |
| Catalyst II |  |  |  |  |  |
| DI Water | 70.0 | 70.0 | 70.0 | 70.0 | 70.0 |
| Ammonium persulfate | 1.5 | 1.5 | 1.5 | 1.5 | 1.5 |
| Neutralizer |  |  |  |  |  |
| D. water | 10.0 | 10.0 | 10.0 | 10.0 | 10.0 |
| Ammonia | 3.0 | 3.0 | 3.0 | 3.0 | 3.0 |
| Total | 906.8 | 906.8 | 906.9 | 906.8 | 906.8 |

Deionized water (DI) (233.5 g) and sample Surfactant A (8.3 g) were mixed and added to a suitable reactor for emulsion polymerization equipped with agitation, heating and cooling means with a slow continuous nitrogen purge. Under continuous agitation, the temperature of the reactor was raised to 80.0° C. At 80.0° C., a monomer pre-emulsion (28.3 g) [5.0% of a total 560 g of monomer pre-emulsion was prepared by mixing deionized water (149.7 g), Surfactant A (8.3 g), styrene (194 g), butyl acrylate (190 g), acrylic acid (10 g), acrylamide (6 g), and Vinyl trimehoxy silane (2 g)] were added to the reactor (the pre-emulsion was stabilized before adding), followed by a solution of ammonium persulfate (10.5 g) solution [ammonium persulfate (0.5 g) dissolved in the deionized water (10 g)].

The seed was kept for 15 minutes. A small sample was removed to check for the particle size. The continuous addition of the remaining monomer pre-emulsion (532.7 g) and the initiator solution [ammonium persulfate (1.50 g) dissolved in the deionized water (70.0 g)] were set to finish in 3 hours. The reactor was kept at 80° C. for further 30 minutes until the values of the final solids were constant or near maximum theoretical value. The reactor was then cooled below 40° C. and the resulting latex was filter through a polyester filter. The polymer was neutralized to pH 8-8.5 using 28% ammonia hydroxide. The polymer dispersion obtained had solid content of 44.3%, viscosity of 1373 cP, and average particle size of 119.2 d·nm. The latex properties were given in the following table. The other polymers were also prepared by following the similar procedure and the properties were also listed in TABLE 6.

TABLE 6

|  | Comp. C | Surfactant A | Surfactant B | Comp. D | Comp. E |
|---|---|---|---|---|---|
| Solids actual (%) | 44.7% | 44.3% | 44.8% | 44.9% | 44.5% |
| Conversion (%) | 98.85% | 98.10% | 98.99% | 99.45% | 98.49% |
| pH initial | 6.5 | 7.7 | 7.6 | 6.2 | 6.6 |
| PS (nm) | 109.7 | 119.2 | 120.5 | 119.9 | 106.4 |
| Viscosity (30 rpm) | 1770 | 1373 | 766.7 | 763.3 | 1120 |
| Coagulum(%) 200 mesh | 0.001 | 0.08 | 0.12 | 0.2 | 0.24 |

The water whitening and water resistance performance of the polymers prepared were tested by flowing method.

1. Prepare test sample with 3% Texanol (3 g texanol/100 g latex): MFFT below 5 degree C.
2. Clean black colored glass panel with ethanol to make sure there is no contamination.
3. Apply a 120 um wet latex film on the clean black glass panel, preparing each sample in duplicate.
4. Retain black glass panel under room temperature for a day.
5. Immerse black glass panel in deionized water for 3 days.
6. Remove glass panel from water and lightly dry the film and glass with soft paper making sure not to destroy the latex film. Immediately measure the opacity value with a spectrophotometer.

Figure 6:
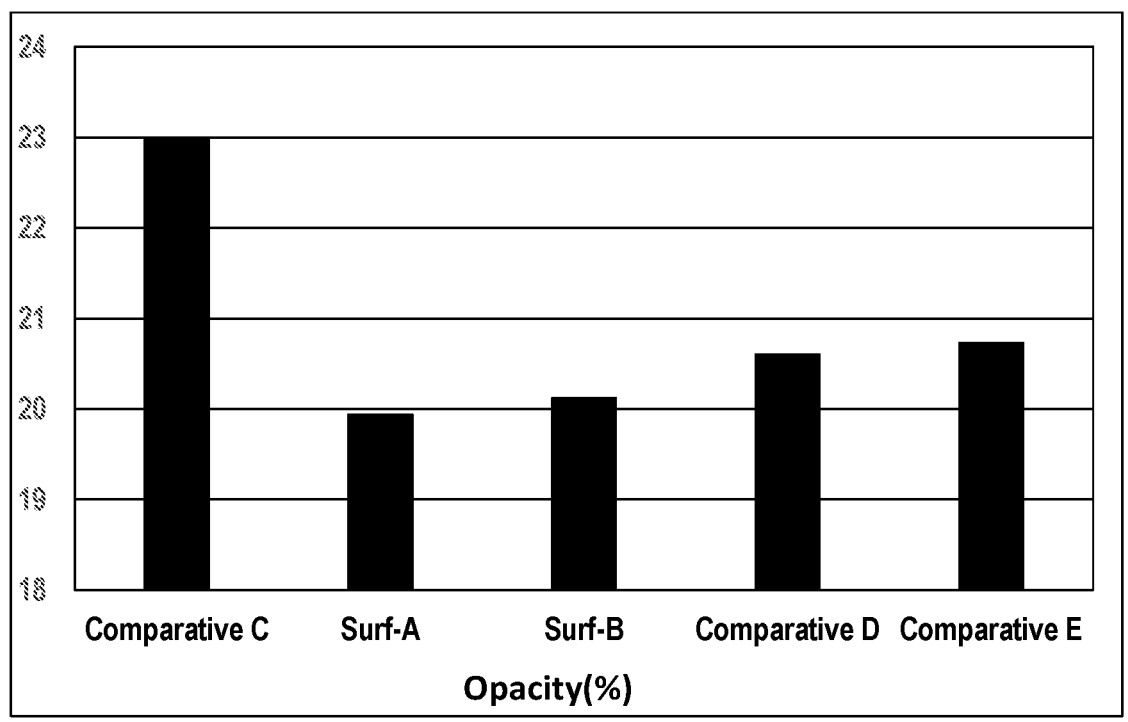
FIG. 6 shows the opacity (%) values of the polymers in TABLE 6, including Surfactant A and Surfactant B.

The opacity value is an indication of the water whitening and water resistance performance of the latex and paint film. Less opacity value showed less water whitening and hence better water resistance. FIG. 6 shows the opacity (%) values of these polymers, and the sample Surfactant A and Surfactant B showed improved water whitening and water resistance properties than the comparative samples.

Example 15. Preparation of latex polymers by using polymerizable surfactant samples prepared in Example 2 (Surfactant B) in a styrene acrylic emulsion polymerization by following the procedure described Example 14. The recipe of the latex polymer is given in

TABLE 7

Comparative surfactant samples, comparative sample E (tristyrenephenol EO phosphate ammonium salt), was also used to prepare latex polymers.
TABLE 7 (in grams)

| Kettle charge |  |
|---|---|
| DI.water | 330.0 |
| Surfactant B | 15.0 |
| Catalyst I |  |
| Ammonium persulfate | 0.6 |
| DI.water | 12.0 |
| Monomer |  |
| DI.water | 130.0 |
| Surfactant B | 10.0 |
| Styrene | 168.0 |
| Butyl acrylate | 205.0 |
| Acrylic acid | 100.0 |
| Acrylamide | 10.0 |
| Vinyl trimehoxy silane | 1.8 |
| Flush | 5.0 |
| Catalyst II |  |
| DI.water | 70.0 |
| Ammonium persulfate | 1.0 |
| Neutralizer |  |
| DI.water | 6.0 |
| Ammonia | 6.0 |
| Total | 1070.4 |

The properties of these polymers are listed in TABLE 8.

TABLE 8

| Properties | Latex G | Latex H |
|---|---|---|
| Surfactant | Surfactant B | Comparative D |
| Solids actual (%) | 45.80% | 46.00% |
| pH | 8.4 | 7.7 |
| PS (nm) | 92 | 100 |
| Viscosity (RVF, 30 rpm) | 996 | 1180 |
| MFFT(° C.) | 23~24 | 24 |

The latex polymers were formulated in a 49% PVC exterior paint for stones or other construction substrates. The paint formulation is given in TABLE 9.

TABLE 9

| | Parts |
|---|---|
| Grind | |
| Water | 130.00 |
| Propylene glycol | 15.00 |
| Rhodoline WA1801 | 4.50 |
| Rhodoline WA 40 | 2.00 |
| QP-30000 | 1.50 |
| AMP-95 | 1.00 |
| Rhodoline DF6002 | 1.00 |
| Tronox CR-826 | 190.00 |
| Calcined Clay | 40.00 |
| Imercarb 3 | 180.00 |
| Letdown | |
| Water | 120.00 |
| Full acrylic Latex (50%) | 274.00 |
| Texanol | 15.00 |
| Rhodoline DF6002 | 2.00 |
| Acticide EG-CF | 2.00 |
| Acticide EPW | 2.00 |
| Acrysol RM2020NPR | 8.00 |
| Acrysol RM8W | 2.00 |
| Water | 10.00 |
| Total | 1000.00 |

The water mark resistance and surfactant leaching properties of this formulated exterior paints were evaluated according to the following method. Results were reported as scale from 1 to 10 with 1 being the worst, 10 being the best. The inventive surfactants significantly improved the watermark resistance and surfactant leaching properties of the paint.

1. Apply 1 coat of paint (150μ-WFT) on the substrate and dry for 24-28 hours.

2. Apply water drops on paint film, allow water droplets to rest for 10 minutes.

3. Lift up panel vertically and allow the water droplets running down.

4. Remain panel in vertical position and observe water mark after dry.

FIG. 1 shows the improved white base paint with watermark resistance, and paint tinted with 5% colorant.

Statements of the Invention

The following statements also describe characteristics that the invention may have.

Statement 1. A polymerizable surfactant composition comprising:

a polymerizable surfactant of formula (I):

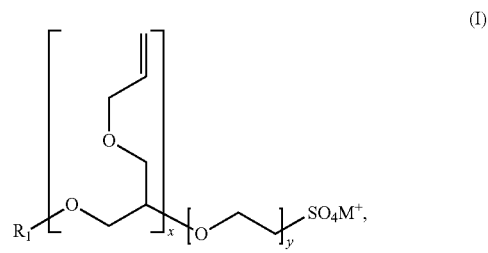

wherein $R_1$ is a $C_8$-$C_{14}$ alkyl group or a bicyclic group;
wherein "x" is an integer from 1-20,
wherein "y" is an integer from 1-30;
wherein $M^+$ is $H^+$, $Na^+$, $NH4^+$, $K^+$ or $Li^+$; and
optionally, at least one surfactant.

Statement 2. The polymerizable surfactant composition of Statement 1, wherein $M^+$ is Na+ or NH4+.

Statement 3. The polymerizable surfactant composition of Statement 1 or 2, wherein "x" is an integer from 1-40, and wherein "y" is an integer from 1-50.

Statement 4. The polymerizable surfactant composition of any of Statements 1-3, further comprising a surfactant comprising any one of sodium alkylbenzene sulfonates or any salt thereof, alkyl sulfosuccinates or any salt thereof, alkyldiphenyloxide disulfonates or any salt thereof, ethoxylated alkylphenol sulfates or any salt thereof, ethoxylated alkylphenol phosphates or any salt thereof, fatty alcohol sulfates or any salt thereof, fatty alcohols phosphates or any salt thereof, alkyl alcohol ethoxylate sulfate or any salt thereof.

Statement 5. The polymerizable surfactant composition of any of the preceding Statements, wherein $R_1$ is a bicyclo$_{[d.e.f]}$heptyl or bicyclo$_{[d.e.f]}$heptenyl group wherein d is 2, 3, or 4, e is 1 or 2, f is 0 or 1, and the sum of d+e+f=5, and which may, optionally, be substituted on one or more of the ring carbon atoms by one or more ($C_1$-$C_6$)alkyl groups.

Statement 7. The polymerizable surfactant composition of any of the preceding Statements, wherein "y" is an integer from 5-15.

Statement 8. A process for preparing a coating comprising introducing the composition of any of the preceding Statements as an emulsifier during emulsion polymerization.

Statement 9. A polymerizable composition comprising:

a polymerizable surfactant of formula (I):

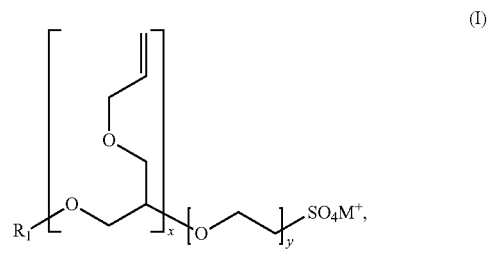

wherein $R_1$ is a $C_8$-$C_{14}$ alkyl group or a bicyclic group;
wherein "x" is an integer from 1-20;
wherein "y" is an integer from 1-30;
wherein $M^+$ is $H^+$, $Na^+$, $NH4^+$, $K^+$ or $Li^+$; and
one or more (co)polymerizable monomers comprising acrylate monomers, styrene monomers, or vinyl ester monomers, and
optionally, at least one surfactant.

Statement 10. The polymerizable composition of Statement 9, wherein $M^+$ is Na+ or NH4+.

Statement 11. The polymerizable composition of Statement 9 or 10, wherein "x" is an integer from 1-40, and wherein "y" is an integer from 1-50.

Statement 12. The polymerizable composition of Statement 9, 10 or 11, further comprising a surfactant comprising any one of sodium alkylbenzene sulfonates or any salt thereof, alkyl sulfosuccinates or any salt thereof, alkyldiphenyloxide disulfonates or any salt thereof, ethoxylated alkylphenol sulfates or any salt thereof, ethoxylated alkylphenol phosphates or any salt thereof, fatty alcohol sulfates or any salt thereof, fatty alcohols phosphates or any salt thereof.

Statement 13. The polymerizable composition of any of Statements 9-12, wherein $R_1$ is a bicyclo$_{[d,e,f]}$heptyl or bicyclo$_{[d,e,f]}$heptenyl group wherein d is 2, 3, or 4, e is 1 or 2, f is 0 or 1, and the sum of d+e+f=5, and which may, optionally, be substituted on one or more of the ring carbon atoms by one or more ($C_1$-$C_6$)alkyl groups.

Statement 14. The polymerizable composition of any of Statements 9-13, wherein "x" is an integer from 1-5.

Statement 15. The polymerizable composition of any of Statements 9-14, wherein "y" is an integer from 5-15.

Statement 16. The polymerizable surfactant composition of any Statements 1-8 or the polymerizable surfactant composition of any Statements 9-15, further comprising at least one ingredient selected from chain transfer agents, additives to adjust pH, and compounds utilized as protective colloids.

Statement 17. A pressure sensitive adhesive comprising the polymerizable surfactant composition of any of Statements 1-8.

Statement 18. The pressure sensitive adhesive of Statement 17, wherein the pressure sensitive adhesive has improved water whitening and water resistance properties relative to polymerizable surfactant composition without the polymerizable surfactant of formula (I).

Statement 19. A pressure sensitive adhesive comprising the polymerizable composition of any of Statements 9-15.

Statement 20. The pressure sensitive adhesive of Statement 19, wherein the pressure sensitive adhesive has improved water whitening and water resistance properties relative to polymerizable surfactant composition without the polymerizable surfactant of formula (I).

Statement 21. A paint with improved watermark resistance and surfactant leaching resistance properties comprising the polymerizable surfactant composition of any of Statements 1-8.

Statement 22. The paint of claim 21, further comprising acrylic latex.

Statement 23. A method comprising polymerizing a mixture of polymerizable polymers and the polymerizable surfactant composition of any of Statements 1-8 by emulsion polymerization.

Statement 24. A method comprising emulsion polymerizing polymerizable composition of any of Statements 9-15 by emulsion polymerization.

Statement 25. A polymerizable surfactant composition comprising:
a polymerizable surfactant of formula (I):

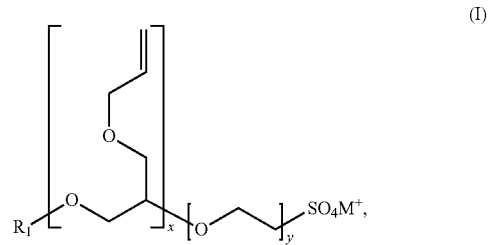

wherein $R_1$ is a $C_8$-$C_{14}$ alkyl group or a bicyclic group;
wherein "x" is an integer from 1-20,
wherein "y" is an integer from 1-30;
wherein $M^+$ is $H^+$, $Na^+$, $NH4^+$, $K^+$ or $Li^+$; and
optionally, at least one additional surfactant.

It is apparent that embodiments other than those expressly described herein come within the spirit and scope of the present claims. Accordingly, the present invention is not defined by the above description, but is to be accorded the full scope of the claims so as to embrace any and all equivalent compositions and methods.

What is claimed is:

1. A polymerizable surfactant composition comprising: a polymerizable surfactant of formula (I):

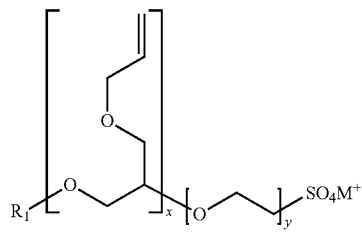

wherein $R_1$ is a bicyclo$_{[d,e,f]}$heptyl or bicyclo$_{[d,e,f]}$heptenyl group wherein d is 2, 3, or 4, e is 1 or 2, f is 0 or 1, and the sum of d+e+f=5, and which may, optionally, be substituted on one or more of the ring carbon atoms by one or more ($C_1$-$C_6$)alkyl groups;
wherein "x" is an integer from 1-40,
wherein "y" is an integer from 1-50;
wherein $M^+$ is $H^+$, $Na^+$, $NH4^+$, $K^+$ or $Li^+$; and optionally, at least one surfactant.

2. The polymerizable surfactant composition of claim 1, wherein $M^+$ is $Na^+$ or $NH_4^+$.

3. The polymerizable surfactant composition of claim 1, wherein "x" is an integer from 1-20, and wherein "y" is an integer from 1-30.

4. The polymerizable surfactant composition of claim 1, wherein the at least one surfactant comprising any one of sodium alkylbenzene sultanates or any salt thereof, alkyl sulfosuccinates or any salt thereof, alkyldiphenyloxide disulfonates or any salt thereof, ethoxylated alkylphenol sulfates or any salt thereof, ethoxylated alkylphenol phosphates or any salt thereof, fatty alcohol sulfates or any salt thereof, fatty alcohols phosphates or any salt thereof, alkyl alcohol ethoxylate sulfate or any salt thereof.

5. The polymerizable surfactant composition of claim 1, wherein "x" is an integer from 1-5.

6. The polymerizable surfactant composition of claim 1, wherein "y" is an integer from 5-15.

7. A process for preparing a coating comprising introducing the composition of claim 1 as an emulsifier during emulsion polymerization.

8. A polymerizable composition comprising: a polymerizable surfactant of formula (I):

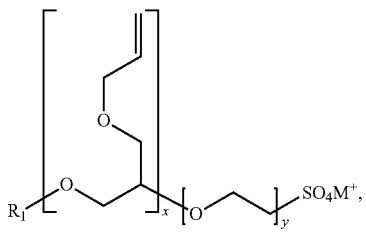

wherein $R_1$ is a bicyclo$_{[d,e,f]}$heptyl or bicyclo$_{[d,e,f]}$heptenyl group wherein d is 2, 3, or 4, e is 1 or 2, f is 0 or 1, and the sum of d+e+f=5, and which may, optionally, be substituted on one or more of the ring carbon atoms by one or more ($C_1$-$C_6$) alkyl groups;
wherein "x" is an integer from 1-40,
wherein "y" is an integer from 1-50;
wherein $M^+$ is $H^+$, $Na^+$, $NH4^+$, $K^+$ or $Li^+$; and
one or more (co)polymerizable monomers comprising acrylate monomers, styrene monomers, or vinyl ester monomers, and
optionally, at least one surfactant.

9. The polymerizable composition of claim 8, wherein $M^+$ is $Na^+$ or $NH_4^+$.

10. The polymerizable composition of claim 8, wherein "x" is an integer from 1-20, and wherein "y" is an integer from 1-30.

11. The polymerizable composition of claim 8, wherein the at least one surfactant comprising any one of sodium alkylbenzene sultanates or any salt thereof, alkyl sulfosuccinates or any salt thereof, alkyldiphenyloxide disulfonates or any salt thereof, ethoxylated alkylphenol sulfates or any salt thereof, ethoxylated alkylphenol phosphates or any salt thereof, fatty alcohol sulfates or any salt thereof, fatty alcohols phosphates or any salt thereof.

12. The polymerizable composition of claim 8, wherein "x" is an integer from 1-5.

13. The polymerizable composition of claim 8, wherein "y" is an integer from 5-15.

14. The polymerizable surfactant composition of claim 1, further comprising at least one ingredient selected from chain transfer agents, additives to adjust pH, and compounds utilized as protective colloids.

15. The polymerizable composition of claim 8, further comprising at least one ingredient selected from chain transfer agents, additives to adjust pH, and compounds utilized as protective colloids.

16. A pressure sensitive adhesive with improved water whitening and water resistance properties comprising a polymer resulting from the polymerizable surfactant composition of claim 1.

17. A pressure sensitive adhesive with improved water whitening and water resistance properties comprising a polymer resulting from the polymerizable composition of claim 8.

18. A paint with improved watermark resistance and surfactant leaching resistance properties comprising a polymer resulting from the polymerization of the polymerizable surfactant composition of claim 1.

19. A paint with improved watermark resistance and surfactant leaching resistance properties comprising a polymer resulting from the polymerization of the polymerizable composition of claim 8.

20. The paint of claim 19 further comprising acrylic latex.

21. The paint of claim 18 further comprising acrylic latex.

\* \* \* \* \*